US009848331B2

(12) United States Patent
Adderly et al.

(10) Patent No.: US 9,848,331 B2
(45) Date of Patent: Dec. 19, 2017

(54) AUGMENTING MOBILE DEVICE ACCESS CONTROL MODES WITH HARDWARE BUTTONS

(71) Applicant: International Business Machines Corporation, Armonk, NY (US)

(72) Inventors: Darryl M. Adderly, Morrisville, NC (US); Prasad Kashyap, Apex, NC (US); Brian J. Murray, Raleigh, NC (US); Wenjian Qiao, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 14/947,120

(22) Filed: Nov. 20, 2015

(65) Prior Publication Data

US 2017/0150359 A1    May 25, 2017

(51) Int. Cl.
*H04M 1/725* (2006.01)
*H04W 12/08* (2009.01)

(52) U.S. Cl.
CPC ......... *H04W 12/08* (2013.01); *H04M 1/7258* (2013.01)

(58) Field of Classification Search
CPC ............................... H04W 4/025; H04W 12/08
USPC ...................................................... 455/456.1
See application file for complete search history.

(56) References Cited

U.S. PATENT DOCUMENTS

| 8,046,721 | B2 | 10/2011 | Chaudhri et al. | |
|---|---|---|---|---|
| 8,117,652 | B1* | 2/2012 | Lu | G06F 21/31 713/182 |
| 8,612,772 | B1 | 12/2013 | Langhammer et al. | |
| 8,904,479 | B1 | 12/2014 | Johansson et al. | |
| 2002/0054120 | A1* | 5/2002 | Kawano | G06F 3/023 715/773 |
| 2004/0054929 | A1* | 3/2004 | Serpa | G06F 21/316 726/5 |
| 2008/0059888 | A1* | 3/2008 | Dunko | G06F 1/1613 715/744 |

(Continued)

FOREIGN PATENT DOCUMENTS

WO    2014131511 A1    9/2014

OTHER PUBLICATIONS

Lancet, Yaara; "How to Launch Multiple Actions Using Nothing But Your Phone's Volume Buttons"; makeuseof; Apr. 29, 2014; Printed on: May 28, 2015; 12 pages; <http://www.makeuseof.com/tag/launch-multiple-actions-using-nothing-phones-volume-buttons/>.
"Additional Security Settings"; Microsoft; Technet; Printed on May 28, 2015; © 2015 Microsoft; pp. 1-4; <https://technet.microsoft.com/en-us/library/cc182302.aspx>.

(Continued)

*Primary Examiner* — Qun Shen
(74) *Attorney, Agent, or Firm* — Maeve Carpenter

(57) ABSTRACT

An approach for improving mobile device security is provided. The approach configures a passcode for accessing a mobile device, wherein configuring the passcode includes incorporating one or more hardware buttons into the passcode, such that the one or more hardware buttons are relevant when entering the passcode to gain entry to the mobile device. The approach receives a passcode attempt on the mobile device, wherein the passcode attempt includes a combination of one or more touch screen buttons and at least one of the one or more hardware buttons. The approach determines whether the passcode attempt matches the passcode. Responsive to a determination that the passcode attempt does not match the passcode, the approach denies access to the mobile device.

20 Claims, 3 Drawing Sheets

(56) References Cited

U.S. PATENT DOCUMENTS

| | | | |
|---|---|---|---|
| 2009/0083070 A1* | 3/2009 | Giftakis | A61N 1/36132 705/2 |
| 2009/0140992 A1 | 6/2009 | Tolaio | |
| 2012/0046077 A1* | 2/2012 | Kim | H04M 1/72577 455/566 |
| 2012/0126940 A1* | 5/2012 | Coggill | G06F 21/36 340/5.54 |
| 2014/0215632 A1 | 7/2014 | Adderly et al. | |
| 2015/0004934 A1 | 1/2015 | Qian et al. | |
| 2015/0033035 A1 | 1/2015 | Haid et al. | |
| 2015/0100498 A1* | 4/2015 | Edwards | G06Q 20/20 705/72 |
| 2015/0113633 A1* | 4/2015 | Yeom | H04L 63/083 726/18 |
| 2015/0350191 A1* | 12/2015 | Yang | H04L 63/083 726/6 |
| 2015/0360646 A1* | 12/2015 | Pribisic | B60R 25/2045 340/5.54 |

OTHER PUBLICATIONS

"Apps to use hardware button to use camera?"; Android Forums at Android Central; Posted on: Mar. 25, 2013; Printed on: May 28, 2015; Copyright © 2015, Mobile Nations; pp. 1-8; <http://forums.androidcentral.com/google-nexus-4/263802-apps-use-hardware-button-use-camera.html>.

"Hard Reset by hardware button/key combination"; Windows Central Forums; Posted on: Feb. 22, 2013, by member stevan58; Printed on: May 28, 2015; Copyright © 2015, Mobile Nations; pp. 1-6; <http://forums.windowscentral.com/samsung-ativ-s/217388-hard-reset-hardware-button-key-combination.html>.

"How to access the hardware camera shutter button in Windows Phone 8"; Microsoft; Printed on: May 28, 2015; © 2015, Microsoft; pp. 1-4; <https://msdn.microsoft.com/en-us/library/windows/apps/hh202963%28v=vs.105%29.aspx>.

"Samsung Galaxy"; Samsung Developers; Printed on: May 28, 2015; © 2014, Samsung; pp. 1-3; <http://developer.samsung.com/galaxy#pass>.

* cited by examiner

AUGMENTING MOBILE DEVICE ACCESS CONTROL MODES WITH HARDWARE BUTTONS

BACKGROUND OF THE INVENTION

The present invention relates generally to mobile device security, and more particularly to enhanced mobile device security by incorporating hardware buttons into access control modes.

Traditional mobile device access methods may include numeric passcodes, gesture patterns, voice recognition, and biometric scanning. For a user to ensure security of their mobile device is not compromised, the user typically may change a numeric passcode when it has been performed in front of others, or refrain from performing an unlock mechanism to gain access to their mobile device in front of others.

SUMMARY

Aspects of an embodiment of the present invention disclose a method, a computer system, and a computer program product for improving mobile device security, in accordance with an embodiment of the present invention. The method includes configuring, by one or more computer processors, a passcode for accessing a mobile device, wherein configuring the passcode includes incorporating one or more hardware buttons into the passcode, such that the one or more hardware buttons are relevant when entering the passcode to gain entry to the mobile device. The method includes receiving, by one or more computer processors, a passcode attempt on the mobile device, wherein the passcode attempt includes a combination of one or more touch screen buttons and at least one of the one or more hardware buttons. The method includes determining, by one or more computer processors, whether the passcode attempt matches the passcode. Responsive to a determination that the passcode attempt does not match the passcode, the method includes denying, by one or more computer processors, access to the mobile device.

DETAILED DESCRIPTION

Embodiments of the present invention provide the capability to enhance mobile device security by augmenting access control modes with hardware buttons already available on a mobile device, as hardware button entries in a passcode sequence would likely go unnoticed by a person who would seek to obtain a user's passcode for their mobile device. Embodiments of the present invention provide the capability to utilize both hardware buttons and displayed touch screen buttons in a passcode sequence to gain access to a mobile device. Embodiments of the present invention provide improved mobile device security by providing a user with a non-apparent and automatic countermeasure to prevent over the shoulder passcode attacks.

Implementation of such embodiments may take a variety of forms, and exemplary implementation details are discussed subsequently with reference to the Figures.

Figure 1:
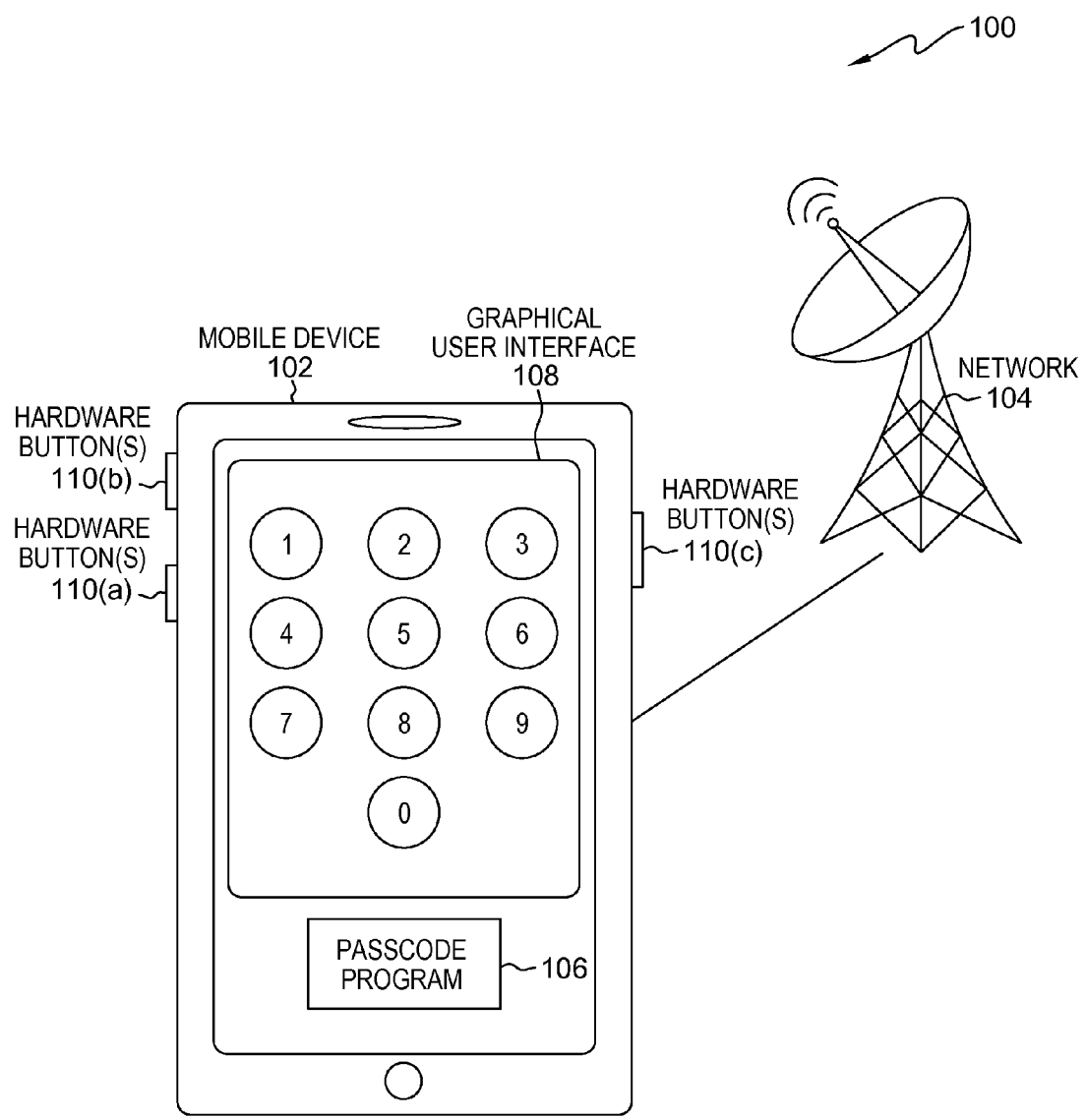
FIG. 1 is a functional diagram illustrating a data processing environment, in accordance with an embodiment of the present invention.

The present invention will now be described in detail with reference to the Figures. FIG. 1 is a functional diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes mobile device 102 and network 104.

In one embodiment, mobile device 102 may be any suitable type of mobile device capable of running mobile applications, including a smart phone, tablet, slate, or any type of device that runs a mobile operating system. In one embodiment, mobile device 102 is a mobile device capable of incorporating hardware buttons into access control modes for enhanced mobile device security. In one embodiment, mobile device 102 includes one or more operating system (OS) application program interfaces (API) that provide the capability to incorporate hardware buttons into access control modes. Mobile device 102 includes passcode program 106, graphical user interface (GUI) 108, and one or more hardware button(s), such as hardware button(s) 110(a), 110(b), and 110(c).

As used herein, "application," "mobile application," or "app" encompasses application software that runs on (or is capable of running on) mobile devices and performs specific tasks for the mobile device's user. In general, applications encompass any software file comprising instructions that can be understood and processed on a computing device, such as, for example, executable files, library modules, object files, script files, interpreter files, executable modules and the like. An application may be capable of being decompiled (decompiling is a process of translating a file, such as an executable file, containing information at a relatively low level of abstraction, such as assembly language, into a higher level of abstraction that may be human readable, such as programming languages like C++). Applications may include native applications (pre-installed on the mobile device by a vendor) such as address books, calendars, calculators, games, maps, and web browsers. Applications may also be downloaded from a plurality of application software distribution platforms (not shown) via a network, such as network 104, for execution on a mobile device, such as mobile device 102.

Mobile device 102 is capable of communicating with one or more mobile devices, networks, and electronic devices or computing systems capable of sending and receiving data through network 104. In one embodiment, network 104 is the Internet representing a worldwide collection of networks and gateways that use TCP/IP protocols to communicate with one another. Network 104 can be any combination of connections and protocols capable of supporting communications between mobile device 102 and one or more mobile devices, networks, and electronic devices or computing systems capable of sending and receiving data through network 104. Network 104 may also be implemented as a number of different types of networks, such as an intranet, a local area network (LAN), a virtual local area network (VLAN), or a wide area network (WAN). Network 104 may include wire cables, wireless communication links, fiber optic cables, routers, switches, and/or firewalls.

In one embodiment, passcode program 106 is a software-based component capable of incorporating hardware buttons into access control modes for enhanced mobile device security. In one embodiment, passcode program 106 provides the capability to augment an access control mode, such as displayed touch screen buttons, voice recognition via a microphone, etc., with one or more hardware buttons already available on a mobile device, such as hardware button(s) 110a, 110b, and 110c. For example, both the one or more hardware buttons, such as hardware button(s) 110a, 110b, and 110c, and the displayed touch screen buttons would be relevant during an unlock attempt to access a mobile device, such as mobile device 102. In one embodiment, passcode program 106 provides the capability for one or more hardware buttons, such as hardware button(s) 110a, 110b, and 110c, to be optionally relevant when entering a passcode to gain entry to a mobile device, such as mobile device 102. In one embodiment, passcode program 106 provides the capability for a user to configure whether the one or more hardware buttons function individually as a key in a passcode (or action) sequence, or whether the one or more hardware buttons function to augment one or more existing touch screen buttons.

In one embodiment, GUI 108 is a conventional user interface on a mobile device, such as mobile device 102. In one embodiment, GUI 108 is a touch screen display that may be represented by a visualization on a display (i.e., a screen) of a mobile device, such as mobile device 102. In one embodiment, GUI 108 provides an interface between a user and an application. In one embodiment, a user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard, mouse, and touch screen, etc., through graphical icons and visual indicators, such as secondary notations, as opposed to text-based interfaces, typed command labels, or text navigation. GUIs were introduced in reaction to the perceived steep learning curve of command-line interfaces, which required commands to be typed on the keyboard. The actions in GUIs are often performed through direct manipulation of the graphics elements, such as, for example, numbers on a touch screen keypad used for entering a passcode or phone number.

In one embodiment, hardware button(s) 110a, 110b, and 110c are conventional hardware buttons found on a mobile device, such as mobile device 102. In one embodiment, hardware button(s) 110a, 110b, and 110c may be a volume-up button, a volume-down button, a power button, or a home button, etc. In one embodiment, hardware button(s) 110a, 110b, and 110c may be utilized by passcode program 106 to function as separate entries in a passcode sequence entered by a user to gain access to a mobile device, such as mobile device 102. In another embodiment, hardware button(s) 110a, 110b, and 110c may be utilized by passcode program 106 to augment one or more touch screen buttons, or other actions, such as voice recognition via a microphone, such that each of the one or more touch screen buttons may be augmented differently based on which of the one or more hardware buttons is used. For example, in a conventional word processing program, where a keyboard selection of "SHIFT-Z" differs in functionality from "CTRL-Z", a combination of, for example, hardware button 110a and touch screen digit 0 may differ in functionality from a combination of hardware button 110b and touch screen digit 0. In one embodiment, hardware button(s) 110a, 110b, and 110c may be fully integrated, partially integrated, or separate from a mobile device, such as mobile device 102. For example, hardware button(s) 110a, 110b, and 110c may be hardware buttons on an external electronic device, where the external electronic device is a device capable of being connected (e.g., hardwire connection, wireless connection, paired, etc.) to a mobile device, such as mobile device 102, and provides the capability for a user to remotely enter a passcode to gain entry to the mobile device via a hardware button sequence including one or more of the hardware buttons.

Figure 2:
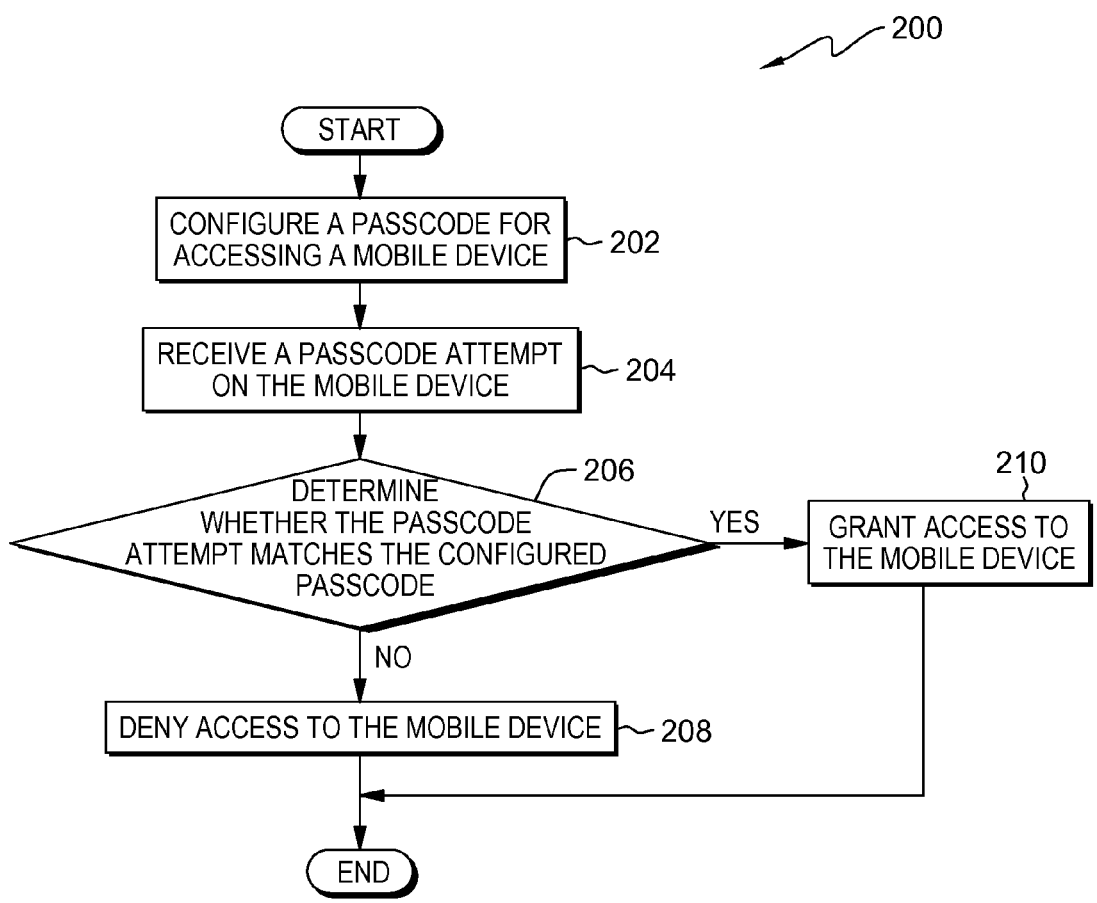
FIG. 2 is a flowchart depicting operational steps of a passcode program (such as the passcode program of FIG. 1) for incorporating hardware buttons into access control modes for enhanced mobile device security, in accordance with an embodiment of the present invention.

FIG. 2 is a flowchart depicting operational steps of a passcode program, such as passcode program 106 of FIG. 1, generally designated 200, for incorporating hardware buttons into access control modes for enhanced mobile device security, in accordance with an embodiment of the present invention.

Passcode program 106 configures a passcode for accessing a mobile device (202). In one embodiment, passcode program 106 configures a passcode for accessing a mobile device, such as mobile device 102, where configuring the passcode includes incorporating one or more hardware buttons, such as hardware button(s) 110a, 110b, and 110c, into the passcode (i.e., a passcode sequence), such that the one or more hardware buttons are relevant when entering the passcode to gain entry to the mobile device. In one embodiment, passcode program 106 configures a passcode including one or more hardware keys, such as hardware button(s) 110a, 110b, and 110c, and one or more soft keys, such as touch screen digits ranging from 0-9, where the hardware keys function individually as a key in a passcode (i.e., action) sequence. In another embodiment, passcode program 106 configures a passcode including one or more hardware keys, such as hardware button(s) 110a, 110b, and 110c, and one or more soft keys, such as touch screen digits ranging from 0-9, where the hardware keys function as a way to augment the one or more soft keys, such that a combination of depressing a hardware key, such as a volume-up button on a mobile device, while simultaneously pressing a soft key, such as "1", registers as an individual key in a passcode sequence.

In one embodiment, one or more hardware buttons, such as hardware button(s) 110a, 110b, and 110c function as optional entries in a passcode for gaining access to a mobile device, such as mobile device 102. In one embodiment, passcode program 106 receives a request to configure the passcode for gaining access to the mobile device. In one embodiment, passcode program 106 may prompt a user to enter a passcode sequence including at least one of the one or more hardware buttons available on the mobile device, where the passcode sequence can be configured to include any number of keys (i.e., soft keys and hardware buttons) based, at least in part, on a level of security desired by a user. For example, passcode program 106 may receive entries for a four key passcode or passcode sequence, where at least one of the four keys in the passcode is a hardware button. In the example, passcode program 106 may configure a passcode requiring four key entries, where the passcode includes a hardware button, such as "1-2-volume-up-4". In one embodiment, passcode program 106 may configure a passcode to include the one or more hardware buttons along with one or more touch screen digits in a defined sequential order, for example, a first entry in a passcode is a first touch screen digit, a second entry in the passcode is a first hardware button, a third entry in the passcode is a second touch screen digit, and a fourth entry is a second hardware button. In one embodiment, passcode program 106 may configure a passcode to include configuring a pre-determined length of time (i.e., duration) that a hardware button must be depressed (i.e., hold duration, press duration, etc.) in order to gain access to the mobile device. For example, passcode program 106 may configure a passcode requiring a first hardware button entry having a short hold duration, and a second hardware button having a long hold duration, such as "1-[volume-up-long-duration]-3-[volume-down-short-duration]. In one embodiment, where an asterisk may be typically displayed to hide the touch screen digits on a display screen of a mobile device when entering a passcode attempt, passcode program 106 may provide a user with the capability to configure whether or not to display an asterisk in response to depressing a hardware button. In another embodiment, where voice recognition, biometric scanning, or swiping patterns may be used to gain access to a mobile device, passcode program 106 may configure, for example, a voice entry passcode to include saying a user's name while depressing a hardware button, such as volume-down, for the duration of the voice entry in order to successfully gain access to the mobile device.

In one embodiment, one or more hardware buttons, such as hardware button(s) 110*a*, 110*b*, and 110*c* function to augment one or more touch screen digits (i.e., buttons). In one embodiment, passcode program 106 may prompt a user to enter a passcode sequence including four touch screen digits, where at least one of the touch screen digits must be entered while depressing at least one of the one or more hardware buttons available on the mobile device. In one embodiment, passcode program 106 may receive, for example, entries for a four key passcode or passcode sequence, where at least one of the four keys in the passcode is a touch screen digit pressed in combination with a hardware button. For example, passcode program 106 may configure a passcode requiring four touch screen digit entries, where the passcode includes holding down a hardware button while entering a first touch screen digit, such as "[1+volume-up]-2-3-4". In another example, similarly to how a CTRL, SHIFT, and ALT key on a conventional keyboard can be used to augment a letter key on the keyboard, passcode program 106 may configure a passcode that requires a user to hold down a hardware button, such as volume-down, continuously for the last three touch screen digits entered during a passcode attempt in order to successfully gain access to the mobile device.

Passcode program 106 receives a passcode attempt on the mobile device (204). In one embodiment, passcode program 106 receives a passcode attempt on the mobile device, where the passcode attempt may include a combination of one or more touch screen buttons and one or more hardware buttons, such as hardware button(s) 110*a*, 110*b*, and 110*c*. In another embodiment, the passcode attempt may be a combination of a voice recognition entry, a swiping pattern entry, or any other conventional access control modes and one or more hardware buttons, such as hardware button(s) 110*a*, 110*b*, and 110*c*. In one embodiment, passcode program 106 stores the passcode attempt on the mobile device in, for example, a temporary storage device or memory.

Passcode program 106 determines whether the passcode attempt matches the configured passcode (206). In one embodiment, passcode program 106 determines whether the passcode attempt matches the configured passcode by determining whether each of one or more entries in the passcode attempt are identical, both in kind and sequence, to each of one or more entries in the configured passcode. Where passcode program 106 determines that each of one or more entries in the passcode attempt are identical, both in kind and sequence, to each of one or more entries in the configured passcode, passcode program 106 determines that the passcode attempt matches the configured passcode. Where passcode program 106 determines at least one of the one or more entries in the passcode attempt is not identical, both in kind and sequence, to at least one of the one or more entries in the configured passcode, passcode program 106 determines that the passcode attempt does not match the configured passcode. For example, where the configured passcode includes three touch screen digits, such as "1-2-3" followed by a long press of a hardware button, such as a volume-up button, and the passcode attempt is "1-2-3-volume-up", passcode program 106 may determine the passcode attempt matches the configured passcode.

Responsive to determining that the passcode attempt does not match the configured passcode (NO branch, 206), passcode program 106 denies access to the mobile device (208). In one embodiment, passcode program 106 denies access to the mobile device, such as mobile device 102, by resetting a passcode attempt field, notifying a user of an invalid passcode attempt, and further prompting a user to re-enter a passcode attempt in order to gain access to the mobile device. In one embodiment, passcode program 106 may prompt a user to re-enter a passcode attempt for a pre-determined number of times, such that after the pre-determined number of times is exceeded, passcode program 106 may lock out the mobile device for a pre-determined lockout period.

Responsive to determining that the passcode attempt does match the configured passcode (YES branch, 206), passcode program 106 grants access to the mobile device (210).

Figure 3:
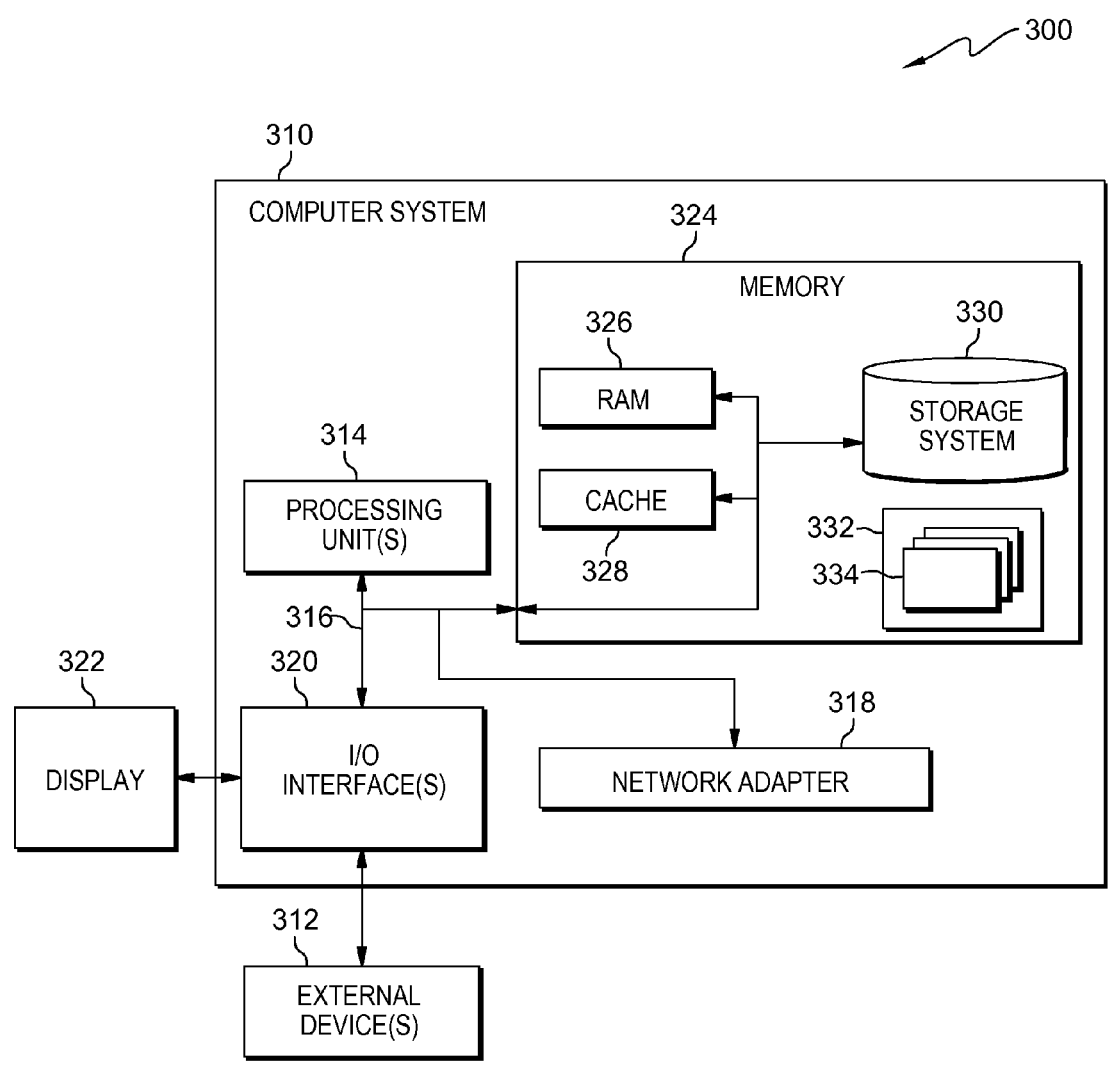
FIG. 3 is a block diagram depicting components of a data processing system (such as the mobile device of FIG. 1), in accordance with an embodiment of the present invention.

FIG. 3 depicts a block diagram of components of data processing environment 100, such as mobile device 102 of FIG. 1, generally designated 300, in accordance with an illustrative embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, mobile device 102 in data processing environment 100 is shown in the form of a general-purpose computing device, such as computer system 310. The components of computer system 310 may include, but are not limited to, one or more processors or processing unit 314, memory 324, and bus 316 that couples various system components including memory 324 to processing unit(s) 314.

Bus 316 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 310 typically includes a variety of computer system readable media. Such media may be any available media that is accessible by computer system 310, and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example, and not limitation, as well as an operating system, one or more application programs, other program modules, and program data. Each of the operating systems, one or more application programs, other program modules, and program data, or some combination thereof, may include an implementation of a networking environment. Program modules 334 generally carry out the functions and/or methodologies of embodiments of the invention as described herein. Computer system 310 may also communicate with one or more external device(s) 312, such as a keyboard, a pointing device, a display 322, etc., or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks, such as a local area network (LAN), a general wide area network (WAN), and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives, and data archival storage systems may be used in conjunction with computer system 310.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for improving mobile device security, the method comprising:
    configuring, by one or more computer processors, a passcode for accessing a mobile device, wherein configuring the passcode includes incorporating one or more hardware buttons into the passcode, such that the one or more hardware buttons are depressed when entering the passcode to gain entry to the mobile device;
    receiving, by one or more computer processors, a passcode attempt on the mobile device, wherein the passcode attempt includes a combination of one or more touch screen buttons and at least one of the one or more hardware buttons, and wherein the one or more hardware buttons augment the one or more touch screen buttons, such that the combination of depressing at least one of the one or more hardware buttons while simultaneously pressing the one or more touch screen buttons registers as an individual key in the passcode attempt;
    determining, by one or more computer processors, whether the passcode attempt matches the passcode; and
    responsive to a determination that the passcode attempt does not match the passcode, denying, by one or more computer processors, access to the mobile device.

2. The method of claim 1, wherein configuring the passcode includes incorporating one or more hardware buttons into the passcode, further comprises:
    configuring, by one or more computer processors, the passcode to include the one or more hardware buttons along with one or more touch screen digits in a defined sequential order.

3. The method of claim 2, further comprises:
    configuring, by one or more computer processors, the passcode to include configuring a pre-determined length of time that at least one of the one or more hardware buttons is depressed in order to gain access to the mobile device.

4. The method of claim 1, further comprises:
    wherein the one or more hardware buttons function to augment the one or more touch screen digits, wherein augmenting includes depressing at least one of the one or more hardware buttons available on the mobile device while at least one of the touch screen digits is depressed in order to gain access to the mobile device.

5. The method of claim 1, wherein determining whether the passcode attempt matches the passcode, further comprises:
    determining, by one or more computer processors, whether each of one or more entries in the passcode attempt are identical, both in kind and sequence, to each of one or more entries in the configured passcode;
    responsive to a determination that each of one or more entries in the passcode attempt are identical, both in kind and sequence, to each of one or more entries in the configured passcode, determining, by one or more computer processors that the passcode attempt matches the configured passcode; and
    responsive to a determination that at least one of the one or more entries in the passcode attempt is not identical, both in kind and sequence, to at least one of the one or more entries in the configured passcode, determining, by one or more computer processors, that the passcode attempt does not match the configured passcode.

6. The method of claim 1, further comprises:
    responsive to a determination that the passcode attempt does match the passcode, granting, by one or more computer processors, access to the mobile device.

7. The method of claim 1, wherein denying access to the mobile device, further comprises:

resetting, by one or more computer processors, a passcode attempt field;

notifying, by one or more computer processors, a user of an invalid passcode attempt; and prompting, by one or more computer processors, a user to re-enter a passcode attempt in order to gain access to the mobile device, wherein prompting the user to re-enter the passcode attempt includes prompting for a pre-determined number of times, wherein after the pre-determined number of times is exceeded, locking the mobile device for a pre-determined lockout period.

8. A computer program product for improving mobile device security, the computer program product comprising:

one or more computer readable storage media and program instructions stored on the one or more computer readable storage media, the program instructions comprising:

program instructions to configure a passcode for accessing a mobile device, wherein configuring the passcode includes incorporating one or more hardware buttons into the passcode, such that the one or more hardware buttons are depressed when entering the passcode to gain entry to the mobile device;

program instructions to receive a passcode attempt on the mobile device, wherein the passcode attempt includes a combination of one or more touch screen buttons and at least one of the one or more hardware buttons, and wherein the one or more hardware buttons augment the one or more touch screen buttons, such that the combination of depressing at least one of the one or more hardware buttons while simultaneously pressing the one or more touch screen buttons registers as an individual key in the passcode attempt;

program instructions to determine whether the passcode attempt matches the passcode; and responsive to a determination that the passcode attempt does not match the passcode, program instructions to deny access to the mobile device.

9. The computer program product of claim 8, wherein program instructions to configure the passcode includes incorporating one or more hardware buttons into the passcode, further comprises:

program instructions to configure the passcode to include the one or more hardware buttons along with one or more touch screen digits in a defined sequential order.

10. The computer program product of claim 9, further comprises:

program instructions to configure the passcode to include configuring a pre-determined length of time that at least one of the one or more hardware buttons is depressed in order to gain access to the mobile device.

11. The computer program product of claim 8, further comprises:

wherein the one or more hardware buttons function to augment the one or more touch screen digits, wherein augmenting includes depressing at least one of the one or more hardware buttons available on the mobile device while at least one of the touch screen digits is depressed in order to gain access to the mobile device.

12. The computer program product of claim 8, wherein program instructions to determine whether the passcode attempt matches the passcode, further comprises:

program instructions to determine whether each of one or more entries in the passcode attempt are identical, both in kind and sequence, to each of one or more entries in the configured passcode;

responsive to a determination that each of one or more entries in the passcode attempt are identical, both in kind and sequence, to each of one or more entries in the configured passcode, program instructions to determine that the passcode attempt matches the configured passcode; and responsive to a determination that at least one of the one or more entries in the passcode attempt is not identical, both in kind and sequence, to at least one of the one or more entries in the configured passcode, program instructions to determine that the passcode attempt does not match the configured passcode.

13. The computer program product of claim 8, further comprises:

responsive to a determination that the passcode attempt does match the passcode, program instructions to grant access to the mobile device.

14. The computer program product of claim 8, wherein program instructions to deny access to the mobile device, further comprises:

program instructions to reset a passcode attempt field;

program instructions to notify a user of an invalid passcode attempt; and program instructions to prompt a user to re-enter a passcode attempt in order to gain access to the mobile device, wherein prompting the user to re-enter the passcode attempt includes prompting for a pre-determined number of times, wherein after the pre-determined number of times is exceeded, locking the mobile device for a pre-determined lockout period.

15. A computer system for improving mobile device security, the computer system comprising:

one or more computer readable storage media;

program instructions stored on at least one of the one or more computer readable storage media for execution by at least one of the one or more computer processors, the program instructions comprising:

program instructions to configure a passcode for accessing a mobile device, wherein configuring the passcode includes incorporating one or more hardware buttons into the passcode, such that the one or more hardware buttons are depressed when entering the passcode to gain entry to the mobile device;

program instructions to receive a passcode attempt on the mobile device, wherein the passcode attempt includes a combination of one or more touch screen buttons and at least one of the one or more hardware buttons, and wherein the one or more hardware buttons augment the one or more touch screen buttons, such that the combination of depressing at least one of the one or more hardware buttons while simultaneously pressing the one or more touch screen buttons registers as an individual key in the passcode attempt;

program instructions to determine whether the passcode attempt matches the passcode; and responsive to a determination that the passcode attempt does not match the passcode, program instructions to deny access to the mobile device.

16. The computer system of claim 15, wherein program instructions to configure the passcode includes incorporating one or more hardware buttons into the passcode, further comprises:

program instructions to configure the passcode to include the one or more hardware buttons along with one or more touch screen digits in a defined sequential order.

17. The computer system of claim 16, further comprises:
program instructions to configure the passcode to include configuring a pre-determined length of time that at least one of the one or more hardware buttons is depressed in order to gain access to the mobile device.

18. The computer system of claim 17, further comprises:
wherein the one or more hardware buttons function to augment the one or more touch screen digits, wherein augmenting includes depressing at least one of the one or more hardware buttons available on the mobile device while at least one of the touch screen digits is depressed in order to gain access to the mobile device.

19. The computer system of claim 15, wherein program instructions to determine whether the passcode attempt matches the passcode, further comprises:
program instructions to determine whether each of one or more entries in the passcode attempt are identical, both in kind and sequence, to each of one or more entries in the configured passcode;

responsive to a determination that each of one or more entries in the passcode attempt are identical, both in kind and sequence, to each of one or more entries in the configured passcode, program instructions to determine that the passcode attempt matches the configured passcode; and responsive to a determination that at least one of the one or more entries in the passcode attempt is not identical, both in kind and sequence, to at least one of the one or more entries in the configured passcode, program instructions to determine that the passcode attempt does not match the configured passcode.

20. The computer system of claim 15, further comprises:
responsive to a determination that the passcode attempt does match the passcode, program instructions to grant access to the mobile device.

* * * * *